United States Patent [19]

Spies

[11] Patent Number: 4,792,678
[45] Date of Patent: Dec. 20, 1988

[54] PHOTOELECTRIC ANGLE MEASURING DEVICE

[75] Inventor: Alfons Spies, Seebruck, Fed. Rep. of Germany

[73] Assignee: Dr. Johannes Heidenhain GmbH, Traunreut, Fed. Rep. of Germany

[21] Appl. No.: 103,905

[22] Filed: Oct. 2, 1987

[30] Foreign Application Priority Data

Oct. 2, 1986 [DE] Fed. Rep. of Germany ....... 3633574

[51] Int. Cl.$^4$ .............................................. G01D 5/34
[52] U.S. Cl. .......................... 250/231 SE; 250/237 G; 356/374
[58] Field of Search ..................... 250/231 SE, 237 G; 33/125 C; 356/374

[56] References Cited

U.S. PATENT DOCUMENTS 3,612,695 10/1971 Bouwhuis et al. ............. 250/237 G
3,628,026 12/1971 Cronin ........................... 250/237 G
4,629,886 12/1986 Akiyama et al. ............. 250/231 SE

OTHER PUBLICATIONS

"Laser Rotary Encoders," Nishimura et al., Motion, Jul./Aug. 1986, pp. 3–4.
"Laser Rotary Encoders," Nishimura et al., Motion, Sep./Oct. 1986, pp. 14–18.
"Photoelectrical Measurement of the Change of Lengths or Angular Positions with the Help of Diffraction Lattices," Hock, Dissertation Approved by the University of Stuttgart, submitted 10/29/75; pp. 183–184.

Primary Examiner—David C. Nelms
Attorney, Agent, or Firm—Willian Brinks Olds Hofer Gilson & Lione Ltd.

[57] ABSTRACT

In a photoelectric measuring device for measuring the position of two objects which can be rotated relative to each other, a grid located on a graduation support, which is connected with one of the objects, is scanned by a scanning device connected with the other object. To eliminate the eccentricity between the grid and the rotational axis of the graduation support, the light beam emitted by a light source is split in a first graduation area of the grid into two first order diffraction beams, at two diffraction angles. After two-fold deviation by two parallel mirrors, the first order diffraction beams are again joined, in a second graduation area of the grid that lies diametrically opposite the first graduation area. The first order diffraction beams join at the same diffraction angles at which they were emitted from the first graduation area of the grid. Consequently, the beams at the second graduation area are parallel to themselves as they were emitted at the first graduation area.

15 Claims, 3 Drawing Sheets

PHOTOELECTRIC ANGLE MEASURING DEVICE

BACKGROUND OF THE INVENTION

This invention relates to a position measuring device, and particularly to a photoelectric angle measuring device for measuring the angular position of two relatively rotatable objects.

Position measuring devices are used, for example, in processing machines for measuring the relative position of a tool and workpiece. Typically, a scanning unit, connected to the tool, scans the graduation plate connected to the workpiece. The signal obtained as a result of scanning is used to determine the angular position of the tool with respect to the workpiece.

The dissertation, "Photoelectric Measuring of the Change of Lengths or Angular Positions with the Help of Diffraction Grids," by F. Hock, 1975, describes and shows, in FIG. 86, an angle measuring device for the elimination of the angular pitch of a graduation plate. In this device, a light beam from a light source traverses, by means of a condenser, a first angular graduation area of an angular graduation of the graduation plate. The beam is then conducted through a first pentagonal prism, a first deviation prism, and a first objective lens to a Wollaston prism. The prism splits the beam into two partial beams. Both partial beams pass through a second objective lens, a second pentagonal prism, a second deviation prism, and a second angular graduation area located diametrically opposite the first angular grauuation area. Two photoreceivers receive the partial beams by means of a polarizing separator prism. A disadvantage is that, due to the number of optical elements, this device is dimensionally large, and is expensive to assemble and adjust.

In the article "Laser Rotary Encoder," by Nishimura et al., "Motion," July/August, 1986, an angle measuring device for the elimination of eccentricity errors in the angular graduation pitch of aggraduation plate is described at pages 3 and 4. The device comprises a laser diode to produce a light beam which is split by a polarizing separator prism into two partial beams. The first partial beam traverses, by means of a first phase plate and a first mirror, a first angular graduation area of the graduation plate. As the first partial beam passes through the first angular graduation area, diffraction beams are produced. The positive diffraction beam of the first order is reflected, by means of a first reflector, back through the first angular graduation area. The beam is then deflected by means of the first mirror, through the first phase plate, and onto the polarizing separator prism. The polarizing separator prism directs the beam through a third phase plate, a beam separator and a first polarization plate, onto a first photoreceiver.

The second partial beam traverses, by means of a second phase plate and a second mirror, a second angular graduation area of the graduation plate. As the second partial beam traverses through the second angular graduation area, diffraction beams are produced. The negative diffraction beam of the first order is, by means of a second reflector, reflected through the second angular graduation area. The beam is then deflected, by means of the second mirror, through the second phase plate, and onto the polarizing separator prism. The polarizing separator prism directs the beam through the third phase plate, the beam separator, and a second polarization plate onto a second photoreceiver. A disadvantage of this device is that it is relatively complex and is expensive to assemble and adjust. An additional disadvantage is that only half of the light intensity of the laser diode reaches both of the photoreceivers.

SUMMARY OF THE INVENTION

The present invention is directed to an improved position measuring device which provides high resolution angle measurement and small, yet simple, construction, so that a high degree of precision can be attained.

According to a preferred embodiment of this invention, a photoelectric angle measuring device for measuring the angular position of a first object with respect to a second object is provided. The device comprises a graduation support connected to a first object, a grid attached to the graduation support, and a scanning unit connected to a second object for scanning the grid by means of light diffraction. A first graduation area of the grid emits, when scanned by the scanning unit, first and second light beams of a selected diffraction order at first and second diffraction angles respectively. A second graduation area of the grid, located diametrically opposite the first graduation area, receives the diffraction beams such that both beams join at the second graduation area under the same diffraction angles, respectively, at which they were emitted at said first area. In this way, at the second graduation area, the diffraction beams are parallel to themselves as they were emitted at the first graduation area.

As the objects rotate relatively to one another, the phase of each diffraction beam changes at each of the graduation areas. These phase changes also change the intensity of the light emitted by the second graduation area. By measuring the intensity of the light emitted at the second graduation area, the angular position of the two objects with respect to each other may be determined.

One advantage of the invention is the fact that, through the reduction of optical elements, an angle measuring device may be constructed more simply and economically. Another advantage is that an angle measuring device with smaller dimensions results. An additional advantage is that the parts of the angle measuring device are simplified, thereby reducing expenses related to assembly and adjustment. A further advantage is that no significant losses of intensity of the light beams appear between the light source and the photoreceivers. Another advantage is that eccentricity errors between the angular graduation and the rotational axis of the graduation support are effectively eliminated, and tumbling errors have no influence on measuring precision.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
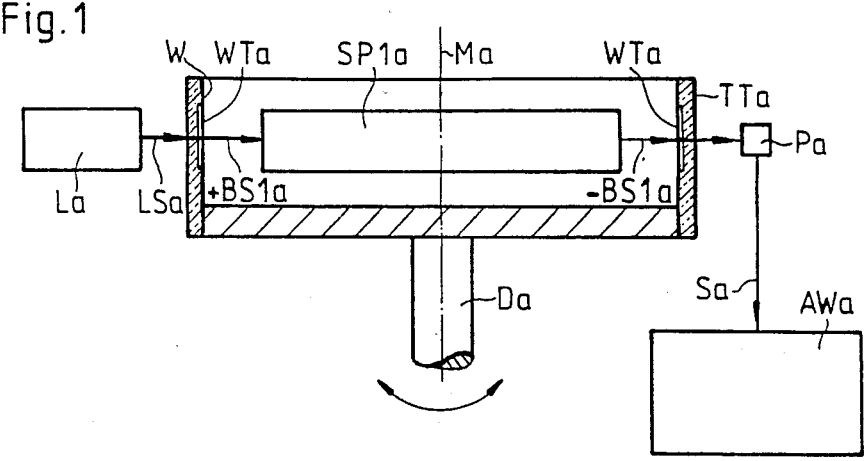
FIG. 1 is a lateral representation of a first preferred embodiment of the angle measuring device.
Figure 2:
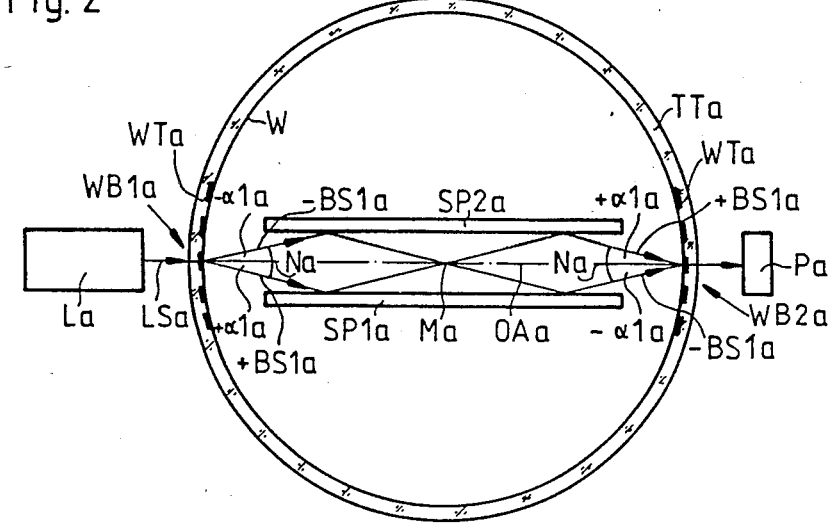
FIG. 2 is a representation of the preferred embodiment shown in FIG. 1 as viewed from above.

Turning now to the drawings, FIGS. 1 and 2 show a first preferred embodiment of the angle measuring device. A rotatable graduation support TTa is connected with a rotatable object, not shown, and is positioned about a rotational axis Da. The graduation support TTa, in the form of a graduation cylinder, comprises a transparent hollow cylinder attached to the rotational axis Da. The internal wall W of the graduation cylinder comprises an angular graduation WTa in the form of a phase grid. The angular graduation WTa is scanned by a scanning unit connected with a stationary object, not shown. The scanning unit comprises a light source La in the form of a laser, two mirrors SP1a, SP2a, and a photoelement Pa. The laser La emits a light beam LSa which traverses, in the radial direction, a first angular graduation area WB1a of the angular graduation WTa. The light beam LSa is diffracted by the angular graduation WTa to produce a positive first order diffraction beam +BS1a and a negative first order diffraction beam +BS1a. The beams +BS1a, +BS1a are emitted at a positive diffraction angle $\alpha1a$ and at a negative diffraction angle $+\alpha1a$, respectively, relative to the norm Na of the angular graduation WTa. The angular graduation WTa is a phase grid constructed such that a diffraction beam of zero order does not appear due to dissolution. The rotatable object referred to above may be a spindle, and the stationary object may be the bed unit of a processing machine.

Both mirrors SP1a, SP2a are attached to the scanning unit in the radial direction relative to the graduation cylinder TTa to be parallel to one another and symmetrical about the optical axis OAa. The diffraction beams +BS1a, −BS1a intersect, after a first deviation by the mirrors SP1a, SP2a, in the center line Ma of the rotational axis Da. The diffraction beams +BS1a, −BS1a join again after a second deviation by the mirrors SP1a, SP2a, in a second angular graduation area WB2a, which is located diametrically opposite the first angular graduation area WB1a. The diffraction angles $+\alpha1a$, $-\alpha1a$, at which the diffraction beams +BS1a, −BS1a join, are equal to the diffraction angles $+\alpha1a$, $-\alpha1a$ at which they were emitted. Because the diffraction beams +BS1a, −BS1a join with the same diffraction angles $+\alpha1a$, $-\alpha1a$, and, because they are deflected twice by the mirrors SP1a, SP2a, they travel in the same direction as and are parallel to themselves as they were emitted at the first angular graduation area WB1a. The beams +BS1a, −BS1a are brought to interference, by means of the second angular graduation area WB2a, and fall on the photoelement Pa. The photoelement Pa thereby produces a periodic scanning signal Sa during the scanning of the angular graduation WTa. A plotting device AWa is connected to the scanning device and obtains measuring values from the periodic scanning signal Sa of the photoelement Pa.

Figure 3:
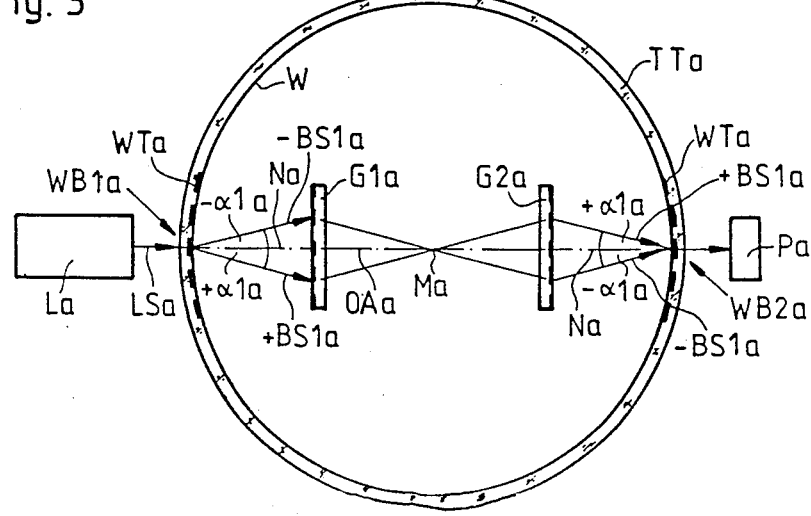
FIG. 3 is a representation of a second preferred embodiment of an angle measuring device as viewed from above.

In FIG. 3, a second preferred embodiment of the angle measuring device is shown in which both mirrors SP1a, SP2a are replaced by two linear grids G1a, G2a. The remaining elements are identical with those of FIG. 2, and thus have the same reference numbers. The linear grids G1a, G2a are attached to the scanning unit and are positioned perpendicular to the radial direction, relative to the graduation cylinder TTa. The grids G1a, G2a are arranged parallel to one another and intersect the optical axis OAa symmetrically about the center line Ma. This configuration allows the beams to follow a path substantially similar to that shown in FIG. 2. The grid constants of the linear grids G1a, G2a depend on the reciprocal of the distance between the graduations of each of the grids G1a, G2a, the reciprocal radial distance between the two grids G1a, G2a, the reciprocal radial distance between the angular graduation areas WB1a, WB2a, and on the grid constants of the angular graduation WTa. Eccentricity errors between the angular graduation WTa and the rotational axis Da of the graduation cylinder TTa are effectively eliminated, as illustrated in greater detail below in connection with a third preferred embodiment.

Figure 4:
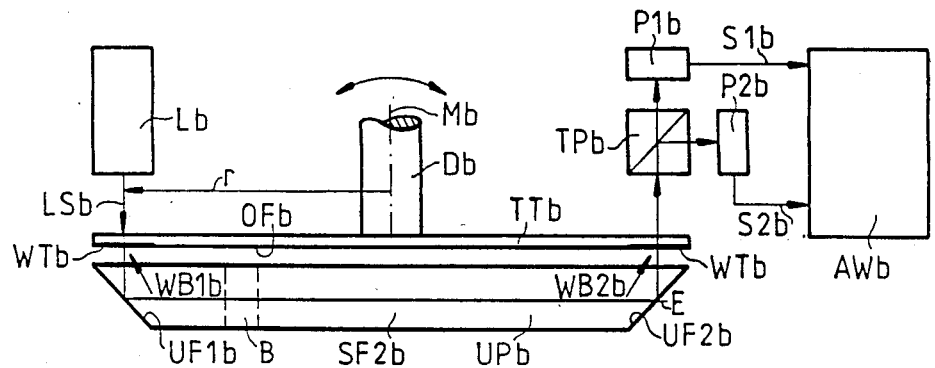
FIG. 4 is a lateral representation of a third preferred embodiment of the angle measuring device.
Figure 5:
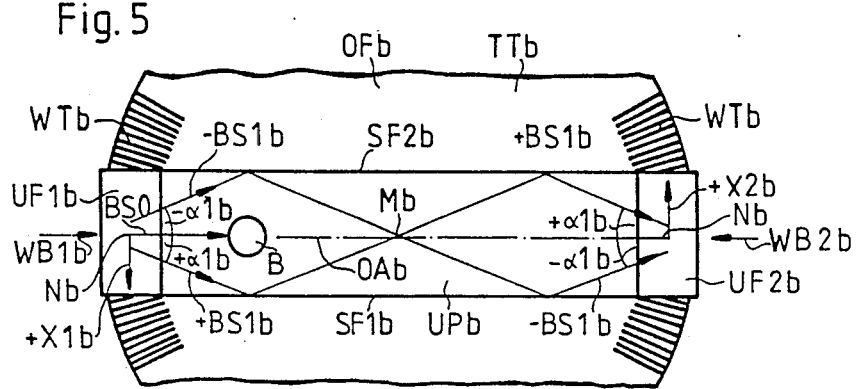
FIG. 5 is a representation of the preferred embodiment shown in FIG. 4 as viewed from below.

A third preferred embodiment of an angle measuring device is shown in FIG. 4. A different view of the same embodiment is shown in FIG. 5. A rotatable graduation support TTb is positioned about a rotatable axis Db and is connected with a rotatable object, not shown. The graduation support TTb, in the form of an even graduation plate, has, on one surface OFb, an angular graduation WTb in the form of a phase grid. This angular graduation WTb is scanned by a scanning unit connected with a stationary object, not shown. The scanning unit includes a light source Lb in the form of a laser, a deviation prism UPb positioned in a radial direction relative to the graduation plate TTb, a polarizing graduation prism TPb, and two photoelements P1b, P2b. The laser Lb emits a linear polarized light beam LSb which is perpendicular to the graduation plate TTb. The light beam LSb traverses a first angular graduation area WB1b of the angular graduation WTb. The angular graduation WTb of the first angular graduation area WB1b splits the light beam LSb into a positive first order diffraction beam +BS1b and a negative first order diffraction beam −BS1b. The beams +BS1b, −BS1b are emitted at a positive diffraction angle $+\alpha1b$ and at a negative diffraction angle $-\alpha1b$, respectively, relative to the norm Nb of the angular graduation WTb. The angular graduation WTb is formed as a phase grid and is constructed so that a diffraction beam of zero order does not appear due to dissolution. The rotatable object referred to above may be a spindle, and the stationary object may be the bed unit of a processing machine.

The first order diffraction beams +BS1b, −BS1b issuing from the first angular graduation area WB1b are deflected by a first deflection surface UF1b of the deviation prism UPb into a plane E parallel to the graduation plate TTb. The diffraction beams +BS1b, −BS1b intersect in the plane E after a first deviation by means of total reflection from the lateral surfaces SF1b, SF2b of the deviation prism UPb, which is symmetric about the optical axis OAb. The point of intersection is in the center line Mb of the rotational axis Db of the graduation plate TTb. The diffraction beams +BS1b, −BS1b undergo a scond deviation through total reflection from the lateral surfaces SF1b, SF2b and are then deflected by a second deflection surface UF2b of the deviation prism UPb in a direction perpendicular to the graduation plate TTb. The beams +BS1b, 31 BS1b join again, in a second angular graduation area WB2b, which is located diametrically opposite the first angular graduation area WB1b. The diffraction angles +α1b, −α1b at which the diffraction beams +BS1b, −BS1b join are equal to the diffraction angles +α1b, −α1b at which they were emitted at the first angular graduation area WB1a. When the diffraction beams of the first order +BS1b, −BS1b join at the second angular graduation area WB2b, they are parallel to themselves as they were emitted at the first angular graduation area WB1a. In the two-fold deviation in the deviation prism UPb, both first order diffraction beams +BS1b, −BS1b experience an elliptical polarization.

Through the second angular graduation area WB2b, the first order diffraction beams +BS1b, −BS1b are brought to interference and subsequently fall on the polarizing separator prism TPb which directs the beams to the photoelements P1b, P2b. During scanning of the angular graduation WTb by the scanning unit, the photoelements P1b, P2b supply two periodic scanning signals S1b, S2b, which are phase-displaced relative to one another by 90°. In a plotting device AWb connected to the scanning unit, the measuring direction (rotation direction of the graduation plate TTb), as well as the relative angular position of the objects are obtained from the periodic scanning signals Sbb, S2b.

Through the two-fold deviation of the beams +BS1b, −BS1b by the lateral surfaces SF1b, SF2b and the reciprocal movement of the angular graduation areas WB1b, WB2b during the rotation of the graduation plate TTb, a modulation of the intensity of the perioiic scanning signals S1b, S2b occurs. The resultant intensity signal has a frequency equal to twice the sum of the tangential movements x1b, x2b of both of the angular graduation areas WB1b, WB2b. This is due to the fact that as the angular graduation areas WB1b, WB2b move, the phase of each of the first order diffraction beams is shifted by each of the moving angular graduation areas WB1b, WB2b. This phase shift affects the intensity of the scanning signals S1b, S2b. Measuring values may therefore be obtained by monitoring the intensity of the periodic scanning signals S1b, S2b.

The modulation of the intensity of both of the scanning signals S1b, S2b can be depicted by the formula:

$$I = I_0 + 2A^2 COS\ (4\pi(x1b + x2b)/g)$$

Where A is the maximum amplitude of both of the periodic scanning signals S1b, S2b; g is the lattice constant of both of the angular graduation areas WB1b, WB2b of the angular graduation WTb; and $I_0$ is a constant factor.

If an eccentricity e exists between the angular graduation WTb and the rotational axis Db of the graduation plate TTb, then there also occurs, in addition to the reciprocal movement of the angular graduation areas WB1b, WB2b, a movement in the same direction of the angular graduation areas WB1b, WB2b. Through the two-fold deviation of the beams +BS1b, −BS1b, there also appears, however, no modulation of the intensity of the scanning signals S1b, S2b due to the movement in the same direction of the angular graduation areas WB1b, WB2b. In such a case, x1b = −x2b in accordance with the sign conventions for x1b, x2b as shown in FIG. 5, and the constant value $I = I_0 + 2A^2$ results from the above formula. This constant value has no influence on the measuring values obtained from the periodic scanning signals S1b, S2b. Therefore an existing eccentricity e between the angular graduation WTb and the rotational axis Db is eliminated on the optical track.

By using an amplitude grid instead of a phase grid for the angular graduation WTb, a diffraction beam of zero order BSO is obtained. This diffraction beam BSO, however, may be masked by a boring B in the deviation prism UPb, preferably in a deviation area where the beams +BS1b, −BS1b are deviated by the lateral surfaces SF1b, SF2b, as shown in FIG. 5.

Since the angular graduation WTb is a radial grid, the grid constant g of the grid is dependent on the radius r. Therefore, since the diffraction angles +α1b, −α1b of the beams +BS1b, −BS1b are dependent on the grid constant g, they are also dependent on the radius r.

Figure 6:
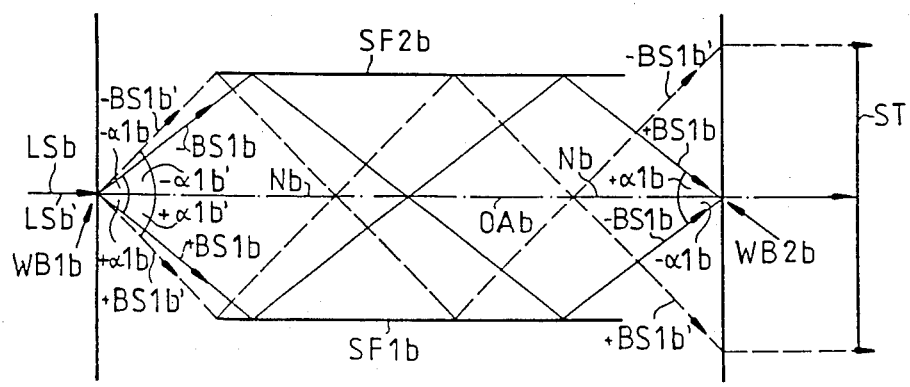
FIG. 6 is a diagram showing a developed light beam path for the angle measuring device of the third preferred embodiment.

In FIG. 6, a developed beam path for the third preferred embodiment is schematically represented. The light beam LSb emitted by the laser Lb at the distance r from the rotational axis Db is, in the first angular graduation area WB1b, split into the first order diffraction beams +BS1b, −BS1b, at the diffraction angles +α1b, −α1b relative to the norm Nb. After two-fold deviations through total reflection from the lateral surfaces SF1b, SF2b, the beams +BS1b, −BS1b join again in the second angular graduation area WB2b at the same diffraction angles +α1b, −α1b.

The light beam LSb' issuing from the laser Lb at the distance r' (where r' is less than r) of the rotational axis Db is, in the first angular graduation area WB1b, split into two first order diffraction beams BS1b', −BSb', at the diffraction angles +α1b', −α1b'. Since the grid constant g' in the first angular graduation area WB1b at the point of the light beam LSb' is smaller than the grid constant g in the first angular graduation area WB1b at the point of the light beam LSb, the diffraction angles +α1b', −α1b' of the beams +BS1b', −BS1b' are smaller than the diffraction angles +α1b, −α1b of the beams +BSb, −BS1b. Thus, the beams +BS1b', −BS1b' do not join after the two-fold deviation on the lateral surfaces SF1b, SF2b in the second angular area WB2b. Instead, in the second angular graduation area WB2b, the beams +BS1b', −BS1b' have a shearing ST (dotted beam path).

Figure 7:
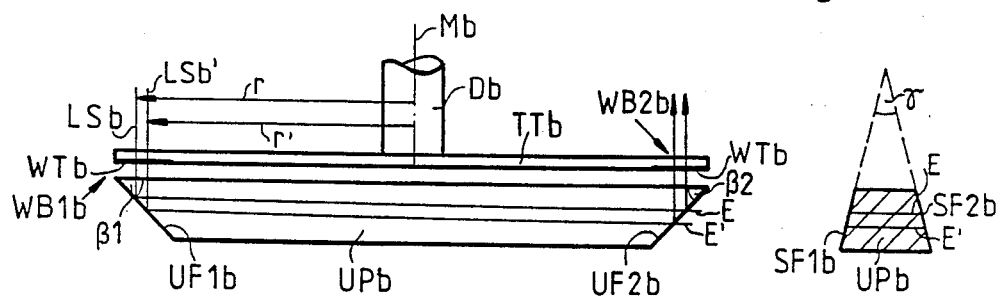
FIG. 7 is a lateral representation of a deviating prism used in the third preferred embodiment.
Figure 8:
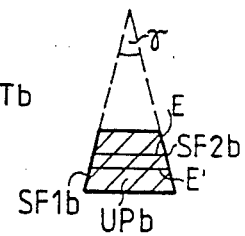
FIG. 8 is a cross-sectional representation of the deviating prism of FIG. 7.

This shearing ST of the beams +BS1b', −BS1b' can be eliminated since the lateral surfaces SF1b, SF2b are not parallel, but rather have a wedge angle γ. In FIG. 7, the deviation prism UPb is represented in a lateral view, and, in FIG. 8, it is represented in cross-section showing the wedge angle γ. Through the wedge angle γ, the deviation prism UPb in the plane E', for the beams +BS1b', −BS1b', has a greater width than in the plane E for the other beams +BS1b, −BS1b. Therefore the beams +BS1b', BS1b' join in the second angular graduation area WB2b as do the beams +BS1b, −BS1b.

Because of the wedge angle γ, the plane E for the beams +BS1b, −BS1b and the plane E' for the beams +BS1b', BS1b' no longer lie parallel to the graduation disk TTb. Therefore the beams +BS1b, −BS1b and the beams +BS1b', −BS1b' are no longer deflected in a direction perpendicular to the graduation plate TTb by the second deflection surface UF2b. This deflection error can be eliminated by requiring that the second deflection surface UF2b have a second deflection angle β2 less than 45°, and that the first deflection surface UF1b have a first deflection angle β1 equal to 45°. In a manner not described here, both of the deflection angles β1, β2 can be unequal to 45°.

Figure 9:
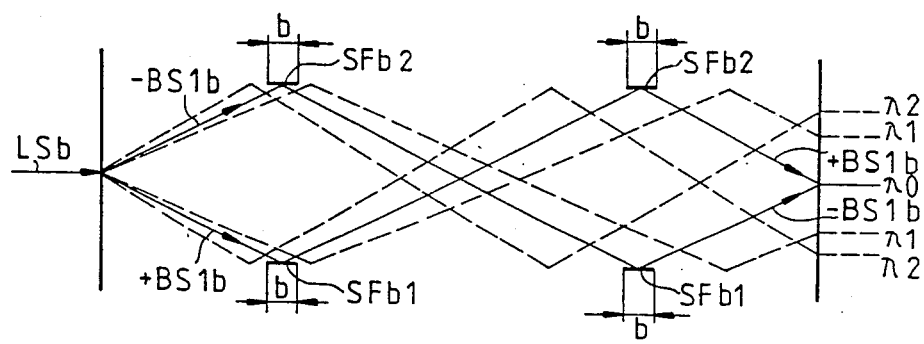
FIG. 9 is a diagram showing another developed light beam path for the angle measuring device of the third preferred embodiment.

The splitting of the light beam LSb into two first order diffraction beams +BS1b, −BS1b in the first angular graduation area WB1b, and the union of the beams +BS1b, −BS1b in the second angular graduation area WB2b, are dependent on the wavelength $\lambda$ of the light beam LSb. The geometrical position of the elements of the third preferred embodiment is only correct for a certain wavelength $\lambda$. If the light beam LSb has a large spectral bandwidth, wavelength filtering must be undertaken. FIG. 9 shows a further developed beam path for the third preferred embodiment in which the beams +BS1b, −BS1b with the wavelength $\lambda_0$, as well as further first order diffraction beams with the wavelengths $\lambda_1$, $\lambda_2$ are represented. The selection of the first order diffracton beams +BS1b, −BS1b with the wavelength $\lambda_0$, and the filtering out of further first order diffraction beams with the wavelengths $\lambda_1$, $\lambda_2$ occurs because the deviation of first order diffraction beams is only possible in those areas with width b, as shown in FIG. 9. These areas with width are where the first order diffraction beams +BS1b, −BS1b, with the wavelength $\lambda_0$, impinge and are the only areas where first order diffraction beams can be deflected.

The invention may be used with photoelectric angle measuring devices, both in transmitted light and impinging light.

Of course, it should be understood that a wide range of changes and modifications can be made to the preferred embodiments described above. It is therefore intended that the foregoing detailed description be regarded as illustrative rather than limiting, and that it be understood that it is the following claims including all equivalents which are intended to define the scope of this invention.

I claim:

1. A photoelectric measuring device for measuring the position of a first object rotatably movable with respect to a second object comprising:
   a graduation support connected to said first object;
   a grid located on said graduation support;
   a scanning unit connected to said second object and positioned to scan said grid by means of light diffraction;
   a first graduation area of said grid, adapted to emit, when scanned by said scanning unit, first and second light beams of a selected diffraction order at first and second angles, respectively, to a normal axis which is defined perpendicular to said first graduation area; and
   a second graduation area of said grid, diametrically opposite said first graduation area, adapted to interact with said first and second light beams such that said first and second light beams strike said second graduation area at the same said first and second angles, respectively, to a normal axis which is defined perpendicular to said second graduation area, such that said light beams are parallel to said light beams as they were emitted at said first graduation area.

2. The measuring device of claim 1 further comprising an optical system positioned between said first and second graduation areas and adapted to deviate said light beams more than once.

3. The measuring device of claim 2 wherein said optical system is two parallel mirrors that deviate said light beams twice.

4. The measuring device of claim 2 wherein said optical system is two linear grids that deviate said light beams twice.

5. The measuring device of claim 2 wherein said optical system is a deviation prism that deviates said light beams twice by total reflection.

6. The measuring device of claim 5 wherein said deviation prism has two lateral surfaces that define a wedge angle.

7. The measuring device of claim 5 wherein said deviation prism comprises a deflection surface having a deflection angle.

8. The measuring device of claim 5 wherein said deviation prism has two deviation areas of a selected width.

9. The measuring device of claim 5 wherein said deviation prism has a boring in a first deviation area.

10. The measuring device of claim 1 wherein said grid is a phase grid.

11. A photoelectric measuring device for measuring the position of a first object rotatably movable with respect to a second object comprising:
    a grid including a first graduation area and a second graduation area, diametrically opposite said first graduation area;
    means, connected to said first object, for supporting said grid;
    means, connected to said second object, for scanning said first graduation area with light;
    means for directing light, from said scanning means, that traverses said first graduation area, to said second graudation area; and
    means for sensing light, for said scanning means, that traverses said second graduation area.

12. The measuring device of claim 11 wherein said light from said scanning means that traverses said first graduation is split into first and second diffraction beams of the first order.

13. The measuring device of claim 11 wherein each of said first and second graduation areas imparts a phase shift on light that traverses each of said first and second graduation areas.

14. The measuring device of claim 13 wherein said phase shift varies when said first object rotates.

15. The measuring device of claim 14 wherein said sensing means senses changes in said phase shift.

* * * * *

UNITED STATES PATENT AND TRADEMARK OFFICE
CERTIFICATE OF CORRECTION

PATENT NO. : 4,792,678
DATED : December 20, 1988
INVENTOR(S) : Alfons Spies

It is certified that error appears in the above-identified patent and that said Letters Patent is hereby corrected as shown below:

In column 3, line 33, please delete the first occurrence of "+BS1a" and substitute therefor -- -BS1a --.

In column 3, line 33, please delete the third occurrence of "+BS1a" and substitute therefor -- -BS1a --.

In column 3, line 34, please delete "$\alpha 1\alpha$" and substitute therefor -- +$\alpha$1a --.

In column 3, line 35, please delete "+$\alpha 1\alpha$" and substitute therefor -- -$\alpha$1a --.

In column 4, line 58, please delete "Eparallel" and substitute therefor --E parallel--.

In column 4, line 66, please delete "scond" and substitute therefor --second--.

In column 5, line 2, please delete "31BS1b" and substitute therefor -- -BS1b --.

UNITED STATES PATENT AND TRADEMARK OFFICE
CERTIFICATE OF CORRECTION

PATENT NO. : 4,792,678
DATED : December 20, 1988
INVENTOR(S) : Alfons Spies

It is certified that error appears in the above-identified patent and that said Letters Patent is hereby corrected as shown below:

In column 5, line 34, please delete "perioilc" and substitute therefor --periodic--.

In column 8, line 41, please delete "graudation" and substitute therefor --graduation--.

Signed and Sealed this

First Day of October, 1991

Attest:

*Attesting Officer*

HARRY F. MANBECK, JR.

*Commissioner of Patents and Trademarks*